INVENTOR.
Hermon Hosmer Scott
BY David Rines
ATTORNEY

INVENTOR.
Hermon Hosmer Scott
BY David Rines
ATTORNEY

Aug. 12, 1952 H. H. SCOTT 2,606,971

METHOD AND SYSTEM FOR REDUCING NOISE IN THE TRANSMISSION OF ELECTRIC SIGNALS

Filed Jan. 19, 1946 7 Sheets-Sheet 3

INVENTOR.
Hermon Hosmer Scott
BY David Rines
ATTORNEY

Aug. 12, 1952    H. H. SCOTT    2,606,971

METHOD AND SYSTEM FOR REDUCING NOISE IN THE TRANSMISSION OF ELECTRIC SIGNALS

Filed Jan. 19, 1946    7 Sheets-Sheet 4

INVENTOR.
Hermon Hosmer Scott
BY David Rines
ATTORNEY

INVENTOR.
Hermon Hosmer Scott
BY David Rines
ATTORNEY

INVENTOR.
Hermon Hosmer Scott
BY David Rines
ATTORNEY

Aug. 12, 1952 H. H. SCOTT 2,606,971

METHOD AND SYSTEM FOR REDUCING NOISE IN THE TRANSMISSION OF ELECTRIC SIGNALS

Filed Jan. 19, 1946 7 Sheets-Sheet 7

INVENTOR.
Hermon Hosmer Scott
BY David Rines
ATTORNEY

Patented Aug. 12, 1952

2,606,971

UNITED STATES PATENT OFFICE 2,606,971

METHOD AND SYSTEM FOR REDUCING NOISE IN THE TRANSMISSION OF ELECTRIC SIGNALS

Hermon H. Scott, Lincoln, Mass., assignor, by mesne assignments, to Myron T. Smith, Concord, Mass., trustee Application January 19, 1946, Serial No. 642,412

16 Claims. (Cl. 178—44)

The present invention relates to electric methods and systems, and more particularly to methods of and systems for attenuating or suppressing background noise, interference, and other spurious disturbances during the transmission, the recording or the reproduction of speech, music, video, and other signals. The term "reducing" or its equivalent will hereinafter be employed generically to include either attenuating or completely suppressing.

Background noise and other extraneous disturbances are usually of two kinds: first, those attendant upon the high-frequency components of the signals; and secondly, those attendant upon their low-frequency components.

An example of the first kind is the annoying surface noises caused by the scratch of the stylus of the needle in phonographic-record reproduction. The problems presented by this type of noise interference are solved in a copending application, Serial No. 641,673, filed January 17, 1946.

The low-frequency noises encountered in typical sound-reproducing systems are hum, motor rumble, and noises caused by sprocket devices, such as are used for driving motion-picture films. In some applications, the high-frequency noises are more annoying than the low-frequency noises; meaning, in music, mainly the range of bass fundamentals, below about 250 cycles, in the region where the human ear is relatively insensitive at low levels. When the high-frequency noises are reduced, however, the low-frequency noises become more manifest, so that it becomes then desirable to control the low-frequency components also.

The present invention will also reduce low-frequency acoustic regeneration, as is sometimes encountered in record-playing and other reproducing systems.

It is accordingly an object of the present invention to provide a new and improved method of and system for reducing or suppressing background noise or other interference of this character accompanying the low-frequency components of the signals.

Since the said low frequencies are seldom present in music except when accompanied by harmonics residing in the higher-frequency ranges, a feature of the invention resides in effecting this control in accordance with the level of the higher frequencies. This prevents loud low-frequency noises from increasing the low-frequency response of the system, thus allowing of their reproduction. It also allows reproduction in the very low-frequency range only under conditions of signal level such that the low-frequency noises are effectively masked and the characteristics of the signal are such as to indicate the probability of the existence of desirable low-frequency components.

Other and further objects will be explained hereinafter, and will be more particularly pointed out in the appended claims.

Figure 1:
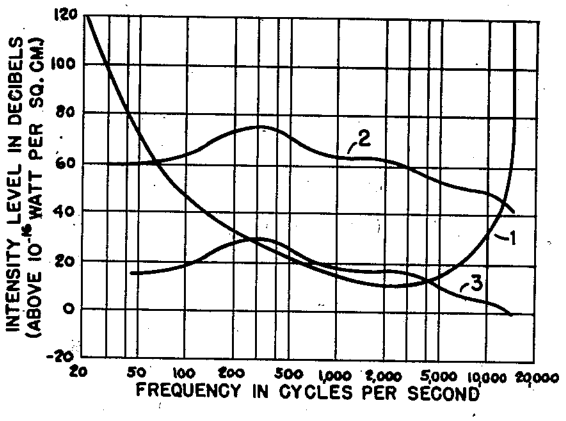
Figure 2:
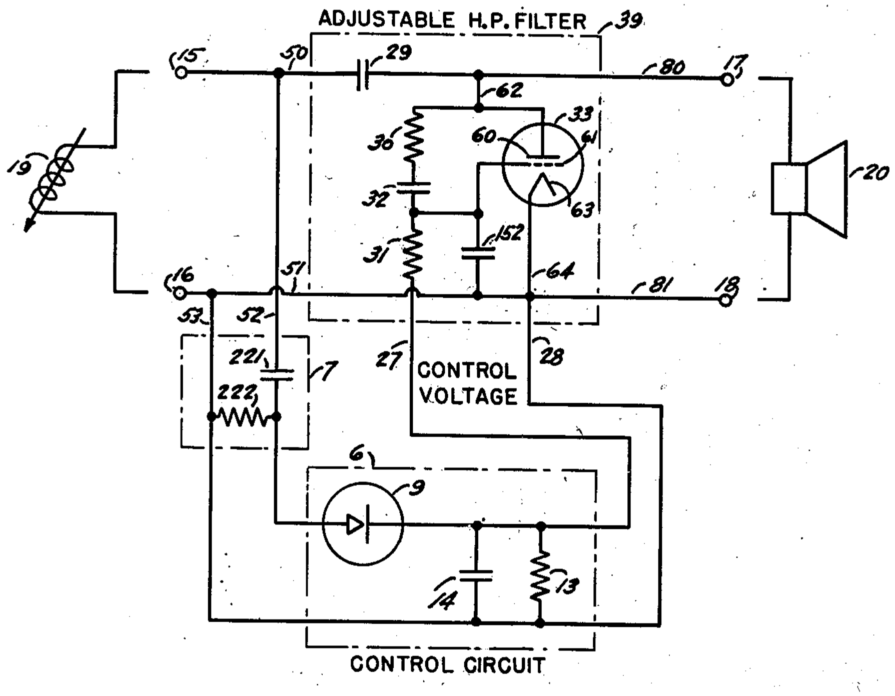
Figure 3:
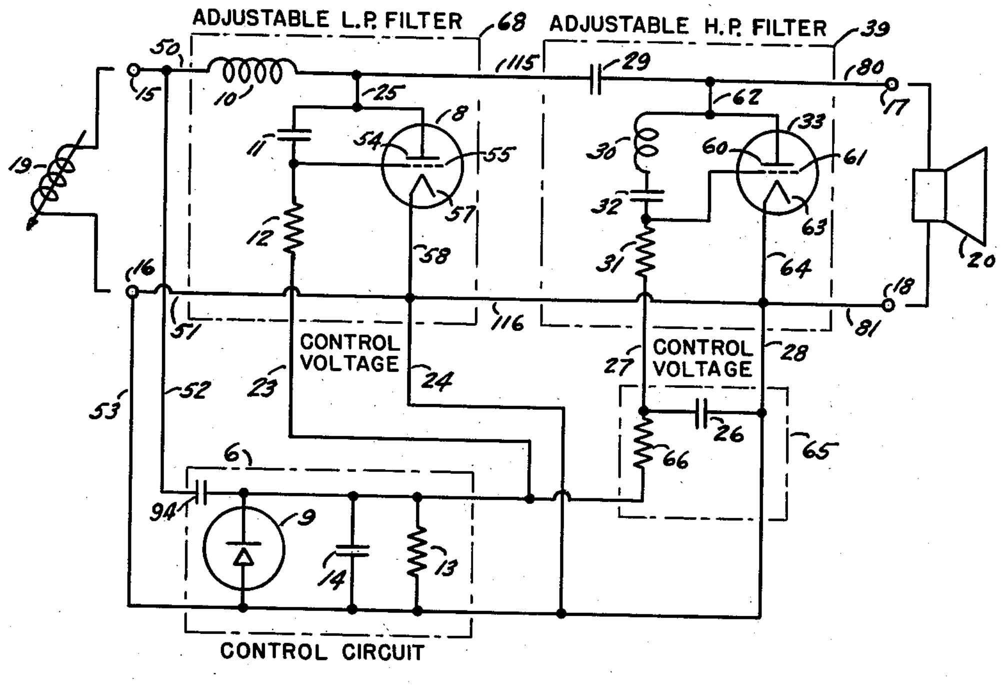
Figure 12:
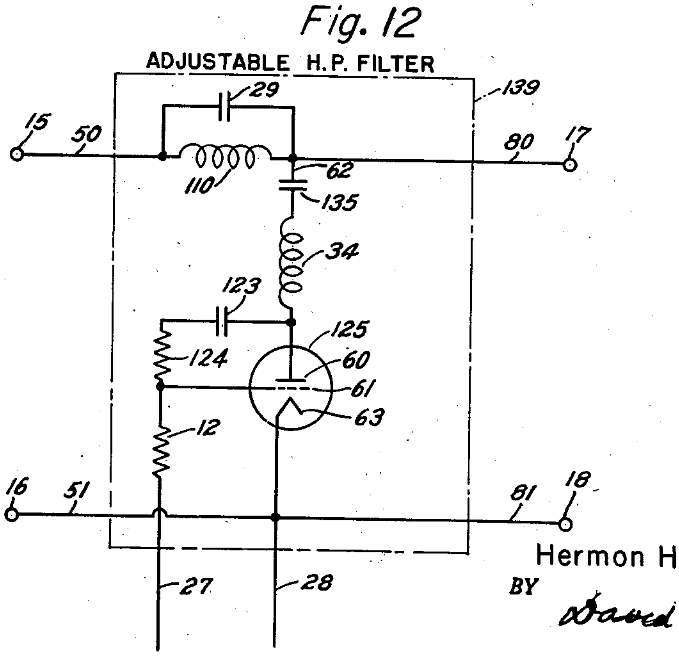
Figure 4:
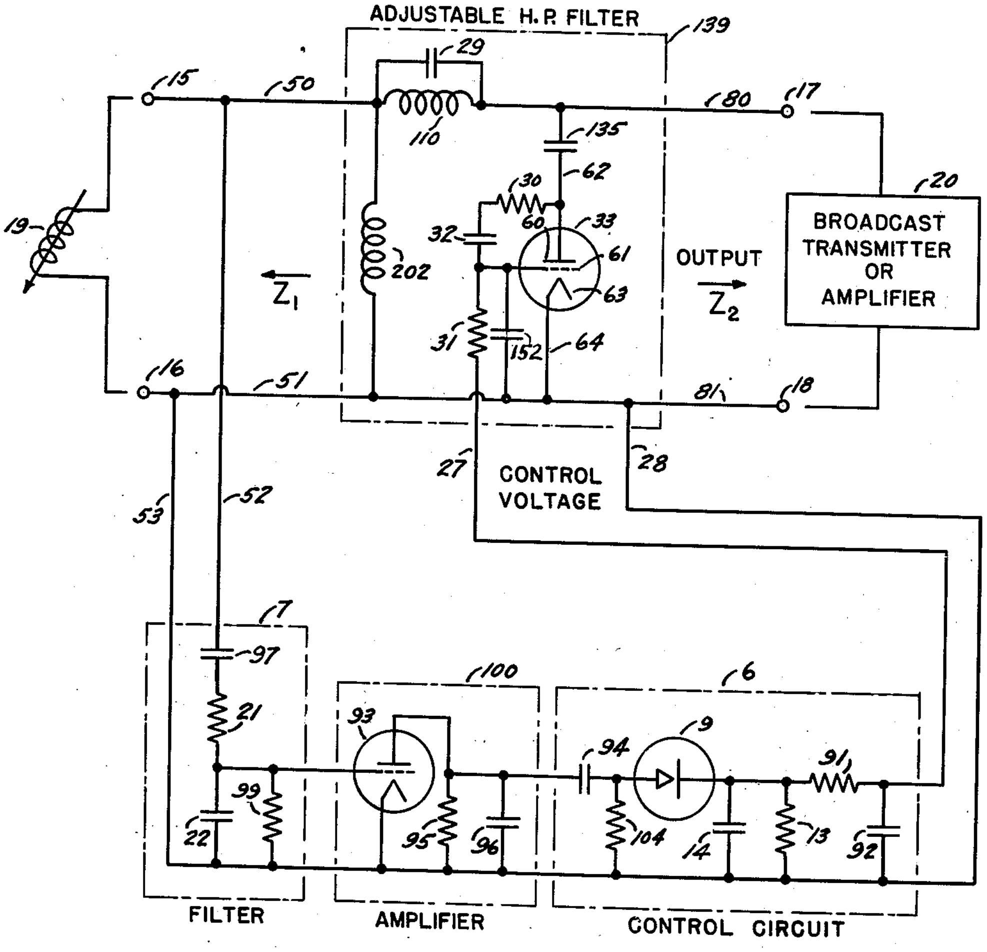
Figure 5:
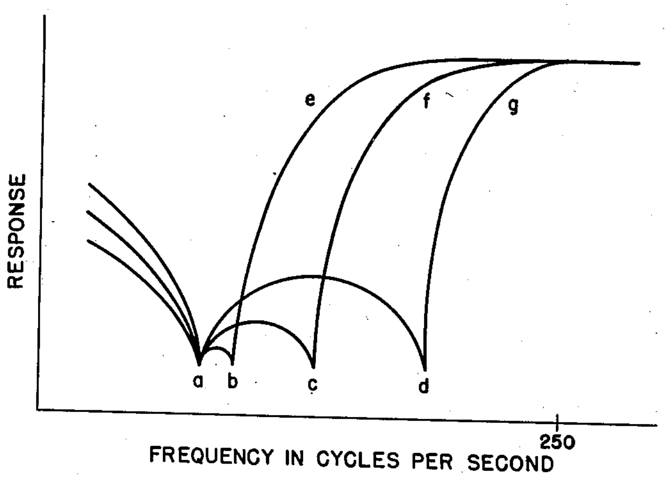
Figure 6:
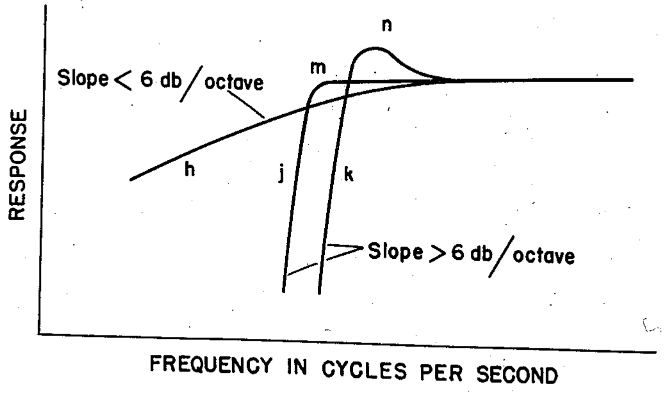
Figure 7:
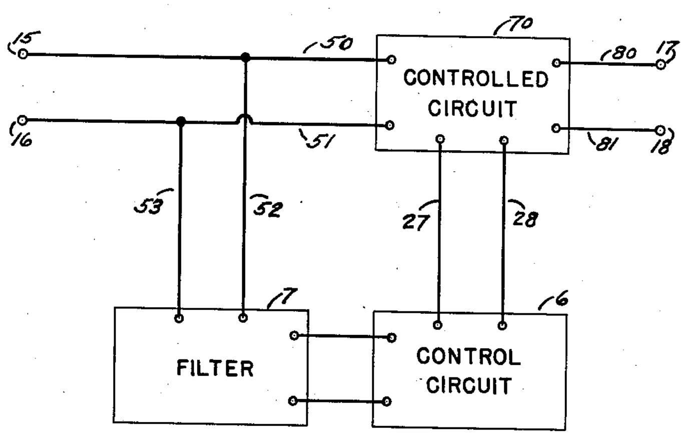
Figure 8:
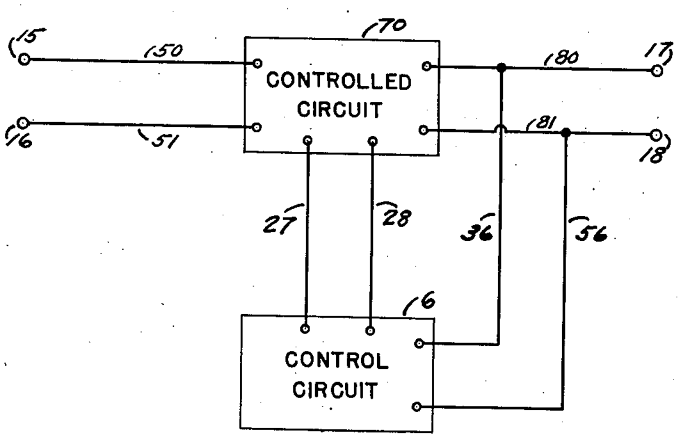
Figure 9:
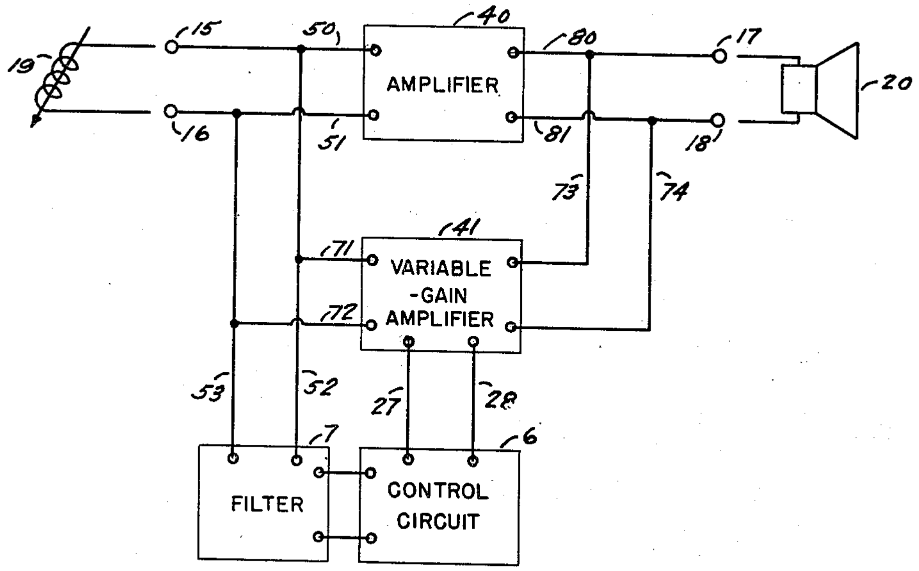
Figure 10:
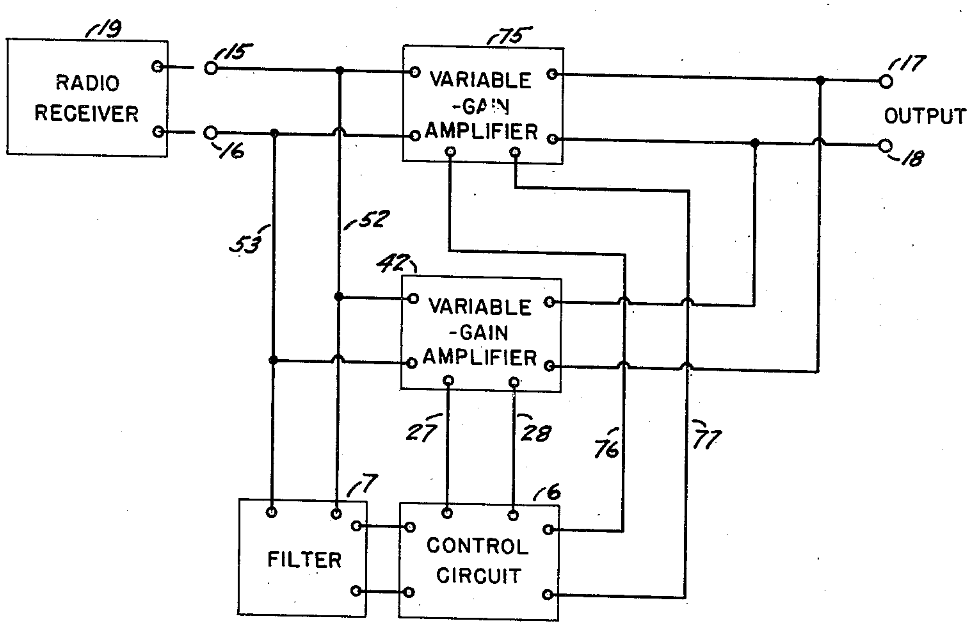
Figure 11:
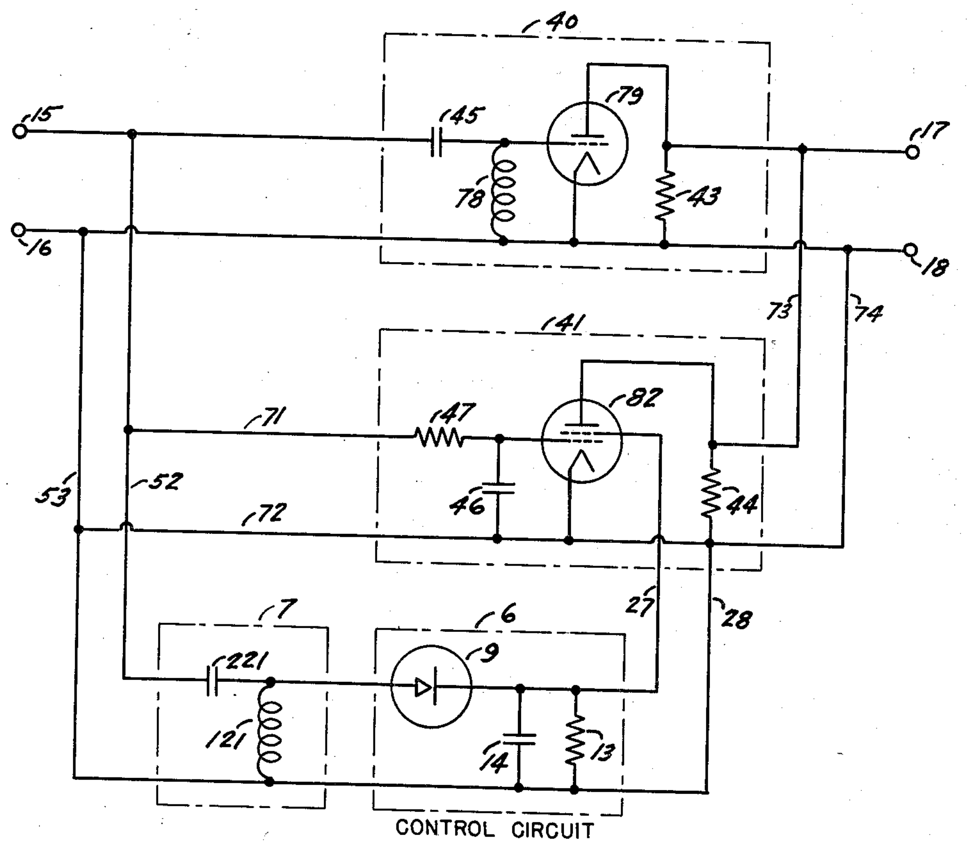

The invention will now be more fully explained in connection with the accompanying drawings, in which Fig. 1 presents a series of graphs representing the frequency-response characteristics of the human ear, and the relative amplitudes and frequencies of the various components present in a typical signal, such as orchestral music, the abscissae being plotted logarithmically in terms of cycles-per-second frequency, and the ordinates being plotted arithmetically in terms of decibel intensity units; Fig. 2 is a diagrammatic view of circuits and apparatus illustrating an embodiment of the invention employing but a single adjustable filter; Fig. 3 is a similar view illustrating another embodiment of the invention employing two adjustable filters, one high-pass and the other low-pass, thus combining the principles of the present invention with those of the inventions disclosed in the said application and application, Serial No. 642,411, filed January 19, 1946; Fig. 4 is a view similar to Fig. 2 of a modification; Figs. 5 and 6 present explanatory diagrams of typical frequency-response curves, with the abscissae, as in the case of Fig. 1, plotted logarithmically, in terms of cycles-per-second frequency, and with the ordinates plotted arithmetically, in terms of decibels-units response; Fig. 7 is a block-diagram view representative of the circuits and apparatus of Figs. 2, 3, 4, 9, 10, 11, and 12; Fig. 8 is a similar view of a modification; Fig. 9 is a similar view limited to circuits employing variable amplifiers; Fig. 10 is a view similar to Fig. 9 of a modification; Fig. 11 is a view similar to Fig. 2, with typical circuit configurations, but embodied in the block-diagram arrangement of Fig. 9; and Fig. 12 is a fragmentary view similar to Fig. 4, showing a typical alternate means for controlling a filter by means of a vacuum tube.

Though the method and system described herein are applicable wherever the degree of perception of the signal-receiving means varies with the characteristics of the signal, the invention, for concreteness, will be explained as it applies to a typical application, namely, the reproduction of music and similar signals by a phonograph or a radio.

From the curve 1 of Fig. 1, representing the threshold of hearing-sensitivity for an ordinary human ear, it appears that the ear is most sensitive in the region around 2,000 cycles, and that the sensitivity falls off rapidly at both lower and higher frequencies.

The curve 2 may be considered to be representative of the energy-distribution characteristics, as a function of frequency, of typical orchestral music at a particular level. When shifted along the axis of ordinates, to correspond to changes in the volume or intensity of the sound, as in response to a volume control or an attenuator, it intersects the threshold curve 1 at relatively-low-frequency points representing the lower limits of the frequency range necessary to reproduce satisfactorily for the listener these particular types of signal at the particular volume or intensity levels. If the level of the curve 2 is reduced equally throughout the range, for instance, to occupy the position of the curve 3, the necessary or perceptible range of frequencies is seen to become accordingly restricted, from about 70 cycles to about 250 cycles at the low-frequency portions of the curves 2 and 3, respectively. If the music or other signal should have frequency components outside this range, they would not be audible.

The curves 2 and 3 may, therefore, be regarded as representative of the required low-frequency response at typical high and low volume or intensity levels, such as may be encountered in the reproduction of music and similar signals, the curve 2 being at an average volume or intensity level of, say, 63 decibels in the region around 1,000 to 2,000 cycles, which contributes most to the loudness as heard by the ear, and the curve 3 at a volume or intensity level of approximately 18 decibels in the same range.

During the reproduction of the orchestral music represented by the curves 2 and 3, for example, variation of the low-frequency range of the equipment, from about 70 cycles, at high-volume levels, as represented by the curve 2, to about 250 cycles, at lower-volume levels, represented by the curve 3, will greatly reduce the background noise at the lower-volume levels. At the higher-volume levels, the noise is inaudible, since it is masked out by the music.

The presence of any noticeable noise in the output of a system indicates that the said noise is above the threshold of hearing. If the characteristics of the signal are such that components in the same frequency range as the noise are below the threshold of hearing, there is obviously no loss in quality in reducing response in this region, and the reduction in noise may be very appreciable; in many cases, substantially complete. Because of the possible high level of the low-frequency noise with respect to the desired signal, it may be desirable to control the low-frequency response in accordance with signal levels at higher frequencies; not necessarily the extremely-highest frequencies in the spectrum, but those frequencies above the range of the control. In accordance with the curves shown in Fig. 1, for instance, which is merely typical, and not restrictive, frequencies below 250 cycles may be controlled by the level of the frequencies above 250 cycles. Depending upon the type of signals to be reproduced, other frequencies may also be used.

According to the present invention, therefore, the rumble and other low-frequency noises are eliminated when the level of all of the frequencies, or preferably, the level of the high frequencies, falls below a predetermined value. By the high frequencies here is meant, not the very high frequencies that cause the phonograph-stylus-needle scratch, but rather, in the instance of the illustration, above given, frequencies above the controlled range, of approximately 250 cycles or above. These frequencies include harmonics or overtones of the lower frequencies in the controlled range.

Referring now to Fig. 7, when an input signal, as from a phonograph pick-up, a radio-receiver, or another source 19, of impedance $Z_1$, is applied to the input terminals 15 and 16, it is transmitted, by input-lead conductors 50 and 51, through a controlled circuit 70, and by way of output-lead conductors 80 and 81, to the output terminals 17 and 18. These may be connected to any output load 20, of impedance $Z_2$, such as a loudspeaker, an amplifier, or a radio transmitter.

The controlled circuit 70 may, for example, be the wave filter 39 shown in Fig. 2, or 139 shown in Figs. 4 and 12, the wave filters 68 and 39 of Fig. 3, the amplifiers 40 and 41 of Figs. 9 and 11, or the amplifiers 75 and 42 of Fig. 10. The transmission paths provided by the amplifiers 40 and 41 of Figs. 9 and 11 and the amplifiers 75 and 42 of Fig. 10 are respectively connected in parallel.

The controlled circuit 70 may be designed to pass normally only a restricted range of low frequencies at low-volume levels. This may be expanded to the full range that it is desirable to transmit at high-volume levels; say, from about 70 to about 12,000 cycles, or from about 90 to about 8,000 or more cycles, or another range depending upon the application and the limitations of associated equipment. The controlled circuit 70 may also be designed so that it shall be able to attentuate or completely suppress, at low-volume levels, in predetermined ratio, the lower range of frequencies; say, the low-frequency components below about 250 cycles, or some similar value, depending upon the application and other factors.

Referring to the practical circuit illustrating the circuit of Fig. 7 that is shown in Fig. 2, the adjustable high-pass wave filter 39 may be controlled in accordance with the level of the input signals to reduce the low-frequency components of the input signal, at say, below about 250 cycles. This control may take place, in accordance with a feature of the present invention, at low-volume levels of the high frequencies of the input signal; say, above about 250 cycles. Within the term "low-volume levels," of course, is included levels of zero volume.

The wave filter 39 is essentially a high-pass half-section comprising a series capacitance 29, connected in the input lead 50, and a variable simulated shunt inductance connected across the output leads 80 and 81. The shunt inductance comprises an inductive reactance tube 33, provided with a feed-back network connected between its anode or plate 60 and its control-grid electrode 61. The reason why the reactance tube 8 functions as an inductance will be explained presently. The anode 60 is connected to the output lead 80 by a lead conductor 62, and the cathode 63 of the tube 33 is connected to the input lead 51 and the output lead 81 by a conductor 64.

The attenuation or suppression is under the control of a control circuit 6. The control circuit 6 is of such nature as to produce no noticeable effect upon the quality of the reproduction.

The input side of the control circuit 6 is subjected to the action of the input signal from the signal source 19 through the medium of lead conductors 52 and 53, respectively connected to the input leads 50 and 51. The control circuit 6 is designed to shift automatically the response range of the control circuit 70.

The output of the control circuit 6 is connected, by a conductor 28, to the cathode 63 and, by a conductor 27, through a resistor 31, to the control grid 61. The resistor 31 thus transmits bias voltage from the control circuit 6 to the grid 61. The grid bias thus developed in the system of the control circuit 6 is therefore transmitted by the leads 27 and 28 to the adjustable filter to impress an adjustable control voltage from the output of the control circuit 6 upon the grid 61.

An optional capacitance 152, connected between the control grid 61 and the cathode 63, and the resistance 31 are so connected as to provide a feed-back network between the plate or output and the grid or input circuits of the reactance tube 33. This feed-back introduces a phase lag of approximately 90° between the plate voltage and the grid voltage of the reactance tube at low frequencies. A condenser 32 connected, in series with a resistor or an inductor 30, between the grid 61 and the anode 60, is provided mainly for blocking purposes, while the resistor 31 transmits the grid bias. The plate or output circuit of the tube 33, with its associated circuits, therefore, as before explained, functions as an inductance. Equivalent circuits for effecting the result may, of course, be used. The magnitude of this simulated inductance of the reactance tube 33 is a function of the transconductance of the tube 33 and this, in turn, is a function of the electrode voltages.

If the capacitance 152 is omitted, the reactance tube 33 of Fig. 2 may simulate a variable resistance; if included, a variable inductance.

The adjustments are such that the control circuit 6 automatically adjusts the cut-off frequency of the filter 39 so as to attenuate all frequency components of the input signal below a predetermined value, such as 250 cycles, at low-volume or low-intensity levels of the signal, or predetermined ranges of the signal. The spurious noises accompanying the low-frequency components are thus eliminated at low-volume levels with a minimum effect upon the tone quality. The system thus adjusts itself automatically to the signal to be transmitted.

Any vacuum tube, such as the tube 33, moreover, may contain more than one control electrode and, as is well known in the art, separate control electrodes may be used for the adjustable bias and the feed-back. Depending upon the normal ratio of signal levels and biases which may be used with practical tubes, moreover, it may be desirable to add attenuation to the circuit, as in the leads 50 and 51, or gain to the circuit, as in the leads 52 and 53, to provide best operating conditions for the vacuum tube.

The characteristics of the control circuit 6 should be so selected for each range as to insure the best performance with the intended type of signal.

A filter network 7 may be inserted in the lead conductors 52 and 53, in the input circuit of the control circuit 6, to vary the response of the controlled circuit 6 with frequency. The filter 7 may comprise a series capacitor 221 (Figs. 2 and 11) or capacitor 97 (Fig. 4) or a shunt inductor as 121 (Fig. 11) and also, as shown in Fig. 4, additional elements. The function of the filter 7 is to prevent the control circuit 6 from operating on signals in the eliminated range of frequencies, and may approximate to the sensitivity characteristics of the ear. This is necessary when the applied signal may have strong low-frequency noise components occurring at levels higher than the desired components. An amplifier 100 may also be inserted in these leads 52 and 53 to increase the magnitude or the effectiveness of the control voltage.

The control circuit 6, which controls the transmission of the filter 39, is thus actuated by signals obtained through the filter 7. The purpose of this and similar filters is to reduce the sensitivity of the control means in the frequency ranges being controlled, thus to prevent the transmission of high-level noise in those ranges.

In the case of signals such as those depicted by the curves 2 and 4, where the volume level is always greatest in a range not being controlled, the control will still reside with the signal, rather than with the spurious noise, even though the filter 7 be not employed, providing that the spurious noise is always at a lower level than higher-frequency components of the desired signal.

As illustrated in Fig. 8, however, a result similar to that obtained with the aid of the filter 7 may be obtained without employing the filter 7. The leads 52 and 53 are shown in Fig. 8 connected to the output terminals 17 and 18, as indicated by the leads 36 and 56. The control voltage is then derived, not from the input, but from the output voltage of the system, under the control of the output signal, at the output level. It may also, however, be derived from a voltage at any point intermediate between the input and the output terminals, depending upon the type of control characteristic desired. The terminals 15 and 16 may represent the input and the terminals 17 and 18 the output, or vice versa.

If the leads 36 and 56 are thus connected to the output terminals 17 and 18, so as to effect control from the output circuit, and if the control circuit 6 is sensitive to low frequencies, the transmission of the low frequencies will not be reduced until the level of the low frequencies, as well as of the high frequencies, becomes decreased. The transmission of the low frequencies cannot then, however, be increased by an increase in the level of the low frequencies. It can be increased only by an increase in the level of the high frequencies. While this operation is not identical with control by the input circuit, through the filter 7, it is satisfactory in many applications, and allows of eliminating the filter 7, thus saving parts and cost. It still has the advantage that the frequency range is not increased by high-level low-frequency noise. With control from the output circuit, and without employing the filter 7, the frequency range of the system can expand only when the high frequencies increase, but will contract only when all the frequencies decrease. The addition of the filter 7 to the system of Fig. 8 in the leads 59 and 60 would give operation similar to that of the system of Fig. 7.

At normal signal levels in the higher frequency ranges, for the type of signal depicted by the curves 2 and 3, the filter 7, in the system of Figs. 2, 3 and 4, is unnecessary to insure that the main control shall be exercised by the higher frequencies, providing that the low-frequency-noise components that may be encountered are not so strong as the higher frequency components in the signal. The filter 7 may be eliminated in the systems of Figs. 2, 3 and 4 also if the input signal is of such character that frequencies within the controlled range are normally at a relatively low level, so that the main control is by other frequency ranges.

Where a considerable degree of noise suppression is required, with a minimum effect upon the audible quality, there should be substantially no attenuation within the range of frequencies perceived by the ear, and the attenuation beyond the lowest perceptible frequency should be as great as possible. The transmission-cut-off characteristics should therefore be as sharp as possible with apparatus that is economically practicable.

The conventional R-C or L-R tone control of a radio receiver may be rendered automatically controllable in response to volume level by means of reactance or variable-resistance tubes or other devices. The rate of increase of attenuation obtained with a circuit of this character, however, approaches six decibels per octave as a maximum, and the cut-off is very gradual, as represented by the curve *h* of Fig. 6. Because of this gradually-changing-loss characteristic applied to the high-frequency response, such operation is often unsatisfactory. By reason of its very nature, when adjusted to provide a reasonable degree of noise suppression, it changes noticeably the quality of the reproduced music at low-volume levels, increasing the brilliance or brightness by attenuating low-frequency tones within the range of the ear.

The gradual cut-off illustrated by the curve *h*, if it produces any appreciable attenuation of low frequency noise, will also produce, at audible frequencies, noticeable attenuation of the signal frequencies, thus causing a high-pitched character in the reproduced music. Such a circuit, when producing, for instance, an attenuation of 20 decibels at 60 cycles, which is a typical lower-frequency limit for phonograph records, would provide also an attenuation of the order of 8 or more decibels at 120 cycles, and 3 or more decibels at 240 cycles, which approximates the middle C. Unless the high frequencies are also attenuated, this may result in an undesirable high-pitched quality. With such a system, the reduction in noise will obviously be relatively small, and the effects upon the quality of reproduction of tone balance very noticeable.

Any reduction in response in this region which contains important musical fundamentals is noticeable and, as before explained, it definitely raises the balance of the treble tones to the lower notes. This results in causing the previously mentioned unnatural high-pitched quality or lack of depth in the reproduction.

Any attempt to improve the quality by decreasing the amount of noise suppression restores the difficulty of the presence of spurious noise. This is because, as before explained, when using an R-C, an L-R, or an equivalent circuit, the attenuation increases so very slowly with frequency.

Most low-frequency noise phenomena, such as rumble, hum, etc., tend to be concentrated at definite low frequencies, below about 250 cycles. For this reason, further to improve the apparent fidelity of a system of this type, an optimum reduction in noise, with the least impairment of musical quality, may be obtained with a sharp cut-off characteristic, as represented by the curves *j* and *k* of Fig. 6. The curve *j* demonstrates that a relatively sharp cut-off *m* may be obtained in a correctly designed reactance-type wave filter, such as is illustrated in Figs. 2, 3, and 4. The curve *k* represents a similar cut-off, but with a resonant peak *n*.

The curve *j* is characteristic of a reactance-type wave filter matched to theoretically correct load impedances, or otherwise connected to impedances having a certain amount of resistance or dissipation. The curve *k* is characteristic of a similar filter operating at impedances deviating from conventional matched values. It will later be pointed out that connecting a relatively low impedance across the input terminals 15 and 16 provides more rapid control of the filter. This tends also to produce a curve such as is indicated at *k*, instead of the curve *j*.

Resonance may be obtained, for instance, by operating a filter, like the filter 39 of Fig. 2, from a relatively low impedance 19. The resonance is further increased by operating the filter into a high impedance, as across the leads 80 and 81. The rate of increase of attenuation for both curves *j* and *k* is greater than six decibels per octave. These curves *j* and *k* also provide less apparent decrease in the low-frequency response, because of the sharp cut-off or the resonance.

The sharp cut-off of the curve *j* reduces the balance of the music less than the gradual cut-off represented by the curve *h*. A resonant type of cut-off, as illustrated by the curve *k*, however, introduces a certain amount of resonance, which would generally be considered undesirable at high-signal levels, but which is not objectionable at low-signal levels, and tends to compensate for the loss of depth caused by attenuating the low frequencies, besides improving the reproduction of transients.

The curves *j* and *k*, therefore, are preferable as cut-off-characteristic curves for the type of system described, not merely on the basis of greater suppression of noise, but also because they provide better apparent low-frequency response. In this type of system, the cut-off functions at low-signal levels only, and the low-frequency range expands as quickly as possible upon application of a higher signal level. Because any artificial bass-resonance caused by the cut-off characteristic is present only at low levels, and the cut-off or resonant frequency shifts rapidly upon application of a loud signal, a more realistic reproduction of transients is provided than in a system as typified by the curve *h*, even though the latter system does not provide so good noise suppression. The disclosed circuits therefore provide both better noise suppression and better apparent fidelity than prior-art devices having relatively gradual cut-off characteristics. The system of the present invention, furthermore, is less critical in regard to the type of signal, the listening level, the listener's acuity of hearing, and other variables usually encountered than prior-art systems.

If the same listener always heard the program over the same range of levels, and the orchestra always produced exactly the same sound spectrum, it would be a simple matter to determine what frequency ranges could be attenuated or suppressed, without affecting the quality noticeably. In any practical application, however, many variations prevail. The usual type of signal, for instance, does not remain constant. Any given signal may deviate from the characteristics represented by the curves 2 and 3, the listening conditions may be different, and an individual's hearing may vary from the average. All listeners, again, do not have equal acuity of hearing. The total sensitivity of the system, from microphone to loudspeaker, moreover, may be varied, or the volume range of the program may be contracted, thus changing the range of listening levels. These factors may result in a condition where, sometimes, the transmitted frequency range of the music is less than the range of the components that would be perceived by the ear. This would impart an unnaturally low-pitched or high-pitched quality to the music, depending upon whether the reproduced signal is most deficient in the high or the low frequencies, respectively. It is desirable, therefore, not merely to reduce noise and other components lying in certain frequency ranges, but also to accomplish the reduction in such a way as to minimize any resulting change of balance that might be perceived by the ear under conditions varying from the exact conditions as typified by the curves of Fig. 1.

For listening levels and music corresponding exactly to the levels depicted in Fig. 1, therefore, a sharp cut-off characteristic in the filter is all that is required to provide maximum reduction of noise with minimum effect upon musical quality. In practice, however, there is not usually any such sharp correspondence. The characteristics vary, and the listening conditions may also vary. Under certain circumstances, therefore, the cut-off fequency may be above the lowest frequency that can be heard by the ear at any particular level, with consequently noticeable reduction in the low-frequency response.

In accordance with a feature of the present invention, however, apparent constancy of aural balance between the energy in the treble notes and the energy in the bass notes may be maintained under such conditions by using a filter having a predetermined degree of resonance in the neighborhood of cut-off, or having resonant circuits operating below critical damping. By reason of this resonance or less-than-critical damping in the neighborhood of the cut-off frequency, an apparent intensification of the response is provided in the region of cut-off, through actually increasing either the amplitude of the components or the duration of transient components in this region, or through a combination of both effects. The net result is to compensate for any reduction in the apparent energy of the bass tones, as heard by the ear, in a manner alternative or supplemental to that described in the said copending application, Serial No. 642,411. The apparent balance between the treble and the bass notes in the music is maintained by increasing the energy in part of the range when the energy in a lower portion of the range is reduced in order to reduce the noise.

The curve *k* of Fig. 6, for example, shows, at *n*, a rise in response with respect to the curves *h* and *j*, thus indicating an increase in amplitude for a particular range of frequencies. Both curves *j* and *k* exhibit, with respect to the curve *h*, sharp cut-off characteristics *m* and *n* indicative of a reactance-type filter that operates through the medium of resonance effects. These effects, if the circuit is less than critically damped, tend to increase the amplitude of the duration of transient sounds in the frequency range involved, thus increasing the stimulus to the ear and, in effect, intensifying such transient sounds. The term "intensifying" may be employed, therefore, to designate increasing the amplitude, or lengthening the duration of, the signals, as through resonance, thus enhancing the effect of the signals in the particular frequency range.

It will be noted that both curves *j* and *k* provide high attenuation to low frequencies, but leave the transmission of frequencies above the cut-off point substantially unchanged or unaltered. This is also true of the curves of Fig. 3 having cut-offs at *e*, *f* and *g*. This is important in order that the suppression of noises may be accompanied by the minimum change in quality.

The present invention, through the use of a filter 39 two or more of the arms of which may each have a reactive impedance, provides a sharp cut-off sufficiently steep so that the attenuation of the low-frequency components of the signals shall increase, below the low-frequency cut-off, at a rate greater than about six decibels per octave. At least one of the reactances or one of the arms is variable to vary the cut-off characteristics.

Because of the absence of moving mechanical parts in the filter 39 and the control circuit 6, it is possible so to design the circuits that the control shall occur at a high rate of speed, sufficient to follow rapidly the demands of the signal. The rapid control is effected without the introduction of noticeable spurious tones into the music arising out of the control function. This improves the reproduction of transients.

Aural balance is restored to a certain degree, therefore, by resonance in the filter, which intensifies the response just above the cut-off. Although this region is referred to as a high frequency region, it is high only in comparison with the low frequencies that are reduced. Actually, as before explained, the lower frequencies in the relatively high-frequency band represent low treble tones or high bass near middle C. By accentuating these tones just above the cut-off, compensation to a large degree is effected for attenuation of the lower frequencies.

The invention is shown in Fig. 3 embodied in a system for reducing not only the low-frequency components, but also the high-frequency components, in accordance with the description in the said application, Serial No. 642,411, for reducing high-frequency noises, or in accordance with the said application, Serial No. 641,673, for maintaining aural balance by alternative or supplemental means. The simple filter 39 of Fig. 2 is replaced by two filters 68 and 39: the latter, high-pass, for reducing the low-frequency components, as below 250 cycles, as in the system of Fig. 2; and the former, low-pass, for reducing the high-frequency components, as above 2,500 cycles. The practical advantage of this is that the low-pass filter 68 that attenuates the higher frequencies, as will be more fully described hereinafter, may be made to function much more rapidly than the high-pass filter 39, which controls the lower frequencies, without introducing noticeable spurious components into the signal in the output of the system as the result of the control operation. This improves the reproduction of transients.

The output conductors 115 and 116 of the low-pass filters 68 lead to the input of the high-pass filter 39, and the output of the high-pass filter 39 is connected by the output conductors 80 and 81 to the output terminals 17 and 18.

The input connections of the high-pass filter 39 are similar to those of the high-pass filter 39 of Fig. 2. The output connections of the control circuit 6 to the high-pass filter 39 are also substantially the same as in the system of Fig. 2. The connections of the reactance tube 8 of the low-pass filter 68, however, are of a somewhat different type from those in Fig. 2.

The function of the low-pass filter is more fully described in the said previously mentioned application.

If desired, the filters 68 and 39 may be provided with separate control circuits, as disclosed in the said application, Serial No. 642,411. As illustrated, however, the same control circuit 6 exercises control over both the filters 68 and 39.

The input connections of the control circuit 6 of Fig. 3 are substantially the same as those of Fig. 2. The control circuit 6 of Fig. 3, like that of Fig. 2, may exercise such control over the low-pass filter 68 as to cause the reduction of the low-frequency components of the input signal, say, below about 250 cycles, at the high-volume levels of the low-frequency components of a signal such as that represented by the curves 2 and 3 of Fig. 1.

The wave filter 68 of Fig. 3 is essentially a low-pass half-section comprising series inductance 10, connected in the input lead 50, and a variable simulated shunt capacitance connected across the leads 115 and 116. The shunt capacitance comprises a capacitive feed-back circuit introducing an approximately 90° phase difference between the plate voltage and the grid voltage of the reactance tube 8, at high frequencies, and comprising a reactance tube 8, provided with a condenser 11 connected between its anode or plate 54 and its control-grid electrode 55. The plate or output circuit of the tube 8, with its associated circuits, therefore functions as a capacitance. Equivalent circuits for effecting this result may be used. The anode 54 and the condenser 11 are connected in parallel to the output lead 80 by a conductor 25, and the cathode 57 of the tube 8 is connected to the input lead 51 and the output lead 81 by a conductor 58.

In the system of Fig. 3, therefore, the filters 68 and 39 are both of the all-reactance type. The reactance tube 8 simulates a variable capacitance, and the reactance tube 33 a variable inductance.

A resistor 12 is connected between the control circuit 6 and the grid 55 by a conductor 23, similarly to the connection of the resistor 31 to the grid 61 by the conductor 27. The conductor 24 corresponds similarly to the conductor 28. The control circuit 6 thus controls the low-pass filter 68 similarly to the control of the high-pass filter 39.

The output connections of the control circuit 6 to the filter 38 may embody an additional R–C filter 65 for the control voltage applied from the control circuit 6 to the high-pass filter 39. The filter 65 is shown comprising a shunt capacitance 26 and a series resistance 68. Though not absolutely necessary, the presence of this additional filter 65 permits of slower control of the low-frequency range by the high-pass filter 39 than of the high-frequency range by the low-pass filter 68. This also reduces a tendency to introduce spurious components into the high-pass filter 39 as a result of the control action.

The control circuit 6 is shown in Fig. 2 as comprising a series rectifier 9 for rectifying the signal, connected in the control-circuit-input lead 52, and a condenser 14 connected across the control-circuit-input leads 52 and 53. The condenser 14, which bypasses signal voltages between the conductors 23 and 24, may be located in associated circuits. The resistance of the rectifier 9 and the capacitance of the condenser 14 provide an R–C filter circuit for reducing the high-frequency components of the rectified signal voltage. A leak resistor 13 is connected in parallel with the capacitance 14. The rectified voltage of the control circuit varies in accordance with the amplitude of the signal applied to the input terminals 15 and 16.

The time constants of the rectifier 9 and the condenser 14 should be so chosen as to allow for rapid expansion of the high-frequency range without introducing spurious noises into the output circuit. The resistance of the leak resistor 13, on the other hand, should be relatively high in value, so that the response of the system shall not contract suddenly, and thus accentuate vibrato or other musical effects. The system should contract as approximately the same rate as the decay of reverberation in normal music.

The control circuit 6 of Fig. 3 is shown as of a slightly different type, in that the rectifier 9 is connected in parallel with the parallel-connected condenser 14 and resistor 13, instead of in series therewith. These control circuits are interchangeable and may be used in the systems of any of the figures, with or without extra amplifiers or filters.

The variable high-pass filter 139 shown in Fig. 4, as a modification of the high-pass filter 39 of Figs. 2 and 3, has improved characteristics. The series arm of the filter containing the capacitor 29 is tuned by means of a parallel-connected inductor 110 to provide a parallel-resonant circuit. This provides a corresponding fixed point of high or substantially infinite attenuation below cut-off of the normal transmission range, where the inductor 110 resonates with the capacitor 29. This is represented at *a* in Fig. 5. This improves the attenuation of the filter below cut-off. By eliminating the tuning inductor 110 in the series arm, the fixed point of high attenuation may be eliminated, where not necessary.

A second capacitor 135, connected in series with the conductor 62, and therefore in series with the variable reactance of the reactance tube 33, forms a series-resonant circuit with the simulated inductance of the reactance tube 33. This provides a point of high attenuation which may be just below the cut-off frequency, represented at *b*, *c*, or *d*, that is variable with the cut-off frequency. This variable point may vary in a predetermined relationship with respect to the cut-off frequency. It may vary from a low value, such as 20 cycles, to a high value, such as 250 cycles or higher, depending upon the characteristics and the limitations of other parts of the system.

Each of these fixed and variable points assures an extremely sharp cut-off. This filter, therefore, provides unusually sharp cut-off and unusually high attenuation below cut-off, allowing of rapid control.

The three curves of Fig. 5 illustrate a typical operating range for the filter of Fig. 4, the curves *e* and *g* representing typical cut-off characteristics for maximum and minimum attenuation, determined by the amplitude of the input signal, and the curve *f* illustrating an intermediate cut-off characteristic. The cut-off curves *e*, *f*, and *g* may, of course, have other shapes, such as are represented at *j* and *k* in Fig. 6. For each variable cut-off frequency of the filter of Fig. 4, there is a corresponding variable point of very high, or substantially infinite, attenuation, represented at *b*, *c*, and *d*, respectively, caused by the series resonance of the capacitance 135 and the inductance of the reactance tube 33, and limited only by the loss of the circuit. The point of substantially infinite attenuation varies in predetermined relationship with the cut-off frequency. There may also be a fixed point of high or substantially infinite attenuation, as at *a*. This circuit therefore, functions as a double-*m*-derived filter having an exceedingly sharp variable low-frequency cut-off characteristic with a very high degree of attenuation above cut-off, and it may have a predetermined amount of resonance in the region of cut-off, thus to increase the response in that region. This type of filter may be varied very rapidly, in accordance with the control voltage or current, without introducing spurious components of the control voltage into the output circuit of the filter.

The fixed point *a* of high attenuation should generally be placed below the normal operating range. It may correspond with some strong noise frequency.

The said fixed and variable points of high attenuation are points at each of which the attenuation reaches a maximum with respect to adjacent higher and lower frequencies, and are determined by series or shunt resonance in one of the filter arms. If the resonant circuits causing the points of high attenuation had no loss whatsoever, or no resistive component, the attenuation at these points would be infinite.

Any impedance $Z_1$ connected to the input leads 80 and 81, such as the pick-up 19, or any interposed amplifier or network, may have an impedance sufficiently low aso as to provide a certain amount of resonant rise in the filter characteristic above cut-off, or less than critical damping for the resonant circuits in the filter. This tends to provide a certain amount of compensation to the ear for the cut-off of the lower frequencies under conditions where frequencies that might be audible may be attenuated, as may occur upon the application of a sudden loud transient.

The resonant effect is improved by connecting a high impedance $Z_2$ across the leads 80 and 81. This condition of resonance may exist at high-signal levels only momentarily, while the cut-off characteristic is shifting to a higher frequency. The resonant condition is therefore not apparent to the ear as such.

The condenser 135 is connected in series with the lead 62, in series with the reactance tube 8. It may be used for blocking or tuning purposes only, or it may be utilized also to improve the control characteristics of the filter. If used, it will, in effect, form a high-pass filter for the control voltage. This filter will shunt to the low-voltage side of the system, through the input or output circuit of the filter, any spurious low-frequency audio components of the control voltage that may reach the control grid 61 from the control circuit 6, and that might otherwise have appeared at the output terminals 17 and 18.

The action of this high-pass filter is particularly effective when the input circuit is connected to a relatively low impedance; and this, as explained previously, will also improve the cut-off characteristic. Rapid control of the circuit may thus be attained without "thumps" or other audio components of the control voltage applied to the grid 61 that might appear in the output circuit.

The control circuit of Fig. 4 is shown including extra amplification 100 and filtering 7 to provide optimum control characteristics. This may be in accordance with the characteristics of the human ear, or for any desired range of frequencies. The control circuit may pass frequencies outside of the controlled range only, thus providing improved discrimination against noise.

The input-filter network 7 embodied in the system of Fig. 4 is shown comprising a condenser 97 and a resistor 21 connected in series in the control-input conductor 52, followed by a capacitor 22 and a resistor 99 connected in parallel across the circuit to reduce the sensitivity to very high and low frequencies. The filter 7 is connected in the input circuit of an amplifier 200 for increasing the magnitude of the control voltage and also for providing additional filtering. The amplifier 200 may comprise a vacuum tube 93 the output circuit of which is provided with a resistor 95. A condenser 96 in parallel with the resistor 95 further reduces the very high-frequency response. A series condenser 94 in the control circuit 6 and serving as a blocking condenser between the amplifier 100 and the control circuit 6, may function also to reduce the sensitivity at low frequencies. The sensitivity of the control system may be made to approximate the characteristics of the ear.

The function of the shunt capacitors 22 and 96 is to reduce the sensitivity of the control system at very high frequencies, so that the control shall be essentially in accordance with frequencies where the ear is most sensitive. The function of the series capacitors 97 and 94 is to reduce the response at very low frequencies, below the cut-off frequency, where the ear is relatively insensitive, and most of the signals may consist of a rumble, hum, or other components. Essentially the result of the control of the circuit may be to approximate the sensitivity characteristics of the ear for the type of signal to be reproduced.

More elaborate filter and amplifier circuits may be used where warranted.

All the tubes are operated within their normal ratings.

The control circuit 6 utilizes an accompanying output filter for filtering the control voltage comprising a series resistor 91 and a parallel capacitor 92, to provide better filtering of the rectified control voltage, thus increasing further the speed of control, without introducing spurious "thumps" into the output.

Another method of controlling the response, combining the fixed filter with a variable-resistance tube, is illustrated in the system of Fig. 12, comprising a variable filter, but the results correspond more to those obtained with the aid of a variable amplifier, more fully described presently. The filter is similar to that of Fig. 4, but the elements are fixed in value, the inductance 34 replacing the reactance tube 33. The shunt arm of the filter contains a variable-resistance tube 125, either with or without a feed-back circuit, shown by dotted lines as comprising a capacitor 123 and a resistor 124 connected in series across the grid. The effect of the filter arm is thus varied by varying the impedance of the tube 125 by means of a control voltage from the control circuit 6. The same method may be applied to the control of the filters shown in Figs. 2, 3, and 11.

The following typical values of the elements employed in the system of Fig. 4 have been found to be effective, in practice:

| | |
|---|---|
| Capacitor 29 ---------------- | 0.02 microfarad |
| Inductor 110 (if used) ------ | 300 henries |

| | |
|---|---|
| Inductor 202 (if used) | 500 henries |
| Capacitor 135 | 0.08 microfarad |
| Resistors 30, 31, and 91 | 2 megohms |
| Capacitors 32 and 152 | 0.01 microfarad |
| Resistors 21, 95, 99, and 104 | 500,000 ohms |
| Capacitor 97 | 500 micromicrofarads |
| Capacitors 22 and 96 | 200 micromicrofarads |
| Capacitor 94 | 0.001 microfarad |
| Capacitors 14 and 92 | 0.05 microfarad |
| Resistor 13 | 5 megohms |
| Resistor 91 | 2 megohms |
| Tubes 33 and 93 | 6SJ7 |
| Rectifier 9 | 6H6 |
| Source impedance $Z_1$ | 60,000 ohms, approximately |
| Load impedance $Z_2$ | 500,000 ohms, approximately |

Where economy is important the inductors 110 and 202 may be omitted.

Other variations of constant-*k*, *m*-derived, lattice-type, and other filters, and various networks, such as parallel-T, bridge-T, etc., which provide characteristics similar to filters, may also be used, provided that they control the frequency response in the manner described. Practically any combination of high-pass and low-pass filters may be used together. The high-pass filters of the systems of Figs. 2 and 4, for example, may be substituted in the system in Fig. 3. As with most filters, moreover, those shown may be operated in either direction, that is, with the input terminals 15 and 16 and the output terminals 17 and 18 interchangeable. In either case, the terminating impedance $Z_1$ of the filter will be on the mid-series side, and the terminating impedance $Z_2$ on the mid-shunt side, of the filter. The various filter half-sections may be connected together to form T or $\pi$ sections.

The systems so far described have been rendered variable with respect to the overall-frequency range by means of filter circuits having variable circuit elements, thus allowing of operation at any of an unlimited number of frequency ranges falling within two sets of limits, one set relatively wide, the other relatively narrow. It is not essential to the carrying-out of the invention, however, to employ variable filters, such as the filters 39 and 139. A similar result may be obtained by other circuit means; for example, means comprising controlled amplifiers providing signal-transmission paths.

The system of Fig. 9 embodies two amplifiers 40 and 41, connected in parallel. The input of the amplifier 40 is connected to the input terminals 15 and 16 by the conductors 50 and 51, and its output is connected to the output terminals 17 and 18 by the conductors 80 and 81. The amplifier 41 is connected to the conductors 50 and 51 by input conductors 71 and 72 and to the out put conductors 80 and 81 by output conductors 73 and 74.

The amplifier 40 is of the fixed type, having a limited or restricted frequency range extending down to only some predetermined value, such as 250 cycles. The amplifier 41 is of the variable-gain type, covering ranges below this predetermined limit, and it is rendered operative by the control circuit 6 and its associated filter 7 (if employed) only when the applied signal is sufficiently strong. It therefore reproduces the low-frequency components below the normal range of the fixed amplifier 40, under the control of the level of the signal.

The signals are thus passed through two transmission paths or channels represented by the amplifiers 40 and 41. The transmission characteristic of one of the transmission paths are so determined by filter or other components as to include frequency ranges normally attenuated in the other path, but desirable for the reproduction of high-level sounds. If one of the paths is high-pass, for example, the other is low-pass. In the system of Fig. 9, the filter associated with the amplifier 40 is high-pass, and the filter associated with the amplifier 41 is low-pass for the control of low frequencies only. Typical circuit configurations are shown in Fig. 11. Band-pass and band-elimination filters may also be used to control both the high and the low frequencies, as described in the said application, Serial No. 642,961.

As explained above, with a particular type of signal, the filter 7 may be eliminated entirely. The filter 7 may be eliminated under other conditions also, as when the control circuit 6 is controlled by the output of the amplifier 40, similarly to the operation of the system of Fig. 8, or by some intermediate point.

The control circuit 6, actuated as before described, in accordance with the amplitude of the applied signal, is such as to permit the restricted-range amplifier 40 to operate only at low levels, and both amplifiers to operate at high levels. The overall response of the system will thus vary with the level of the applied signal. Those frequencies only will tend to be included that are necessary for satisfactory reproduction of the signal at the volume level existing at any particular moment. At low-volume levels, therefore, the restricted-range amplifier 40 is alone in operation. The low-frequency components, with their accompanying noises, are eliminated by reason of the inoperability of the amplifier 41, at this time, to transmit them.

Referring to the practical circuit illustrating the circuit of Fig. 9 that is shown in Fig. 11, the range of the fixed amplifier 40 is restricted by a low-pass filter comprising a series capacitor 45 and a shunt inductor 78. The filter is connected, in any desired manner, to the input circuit of an amplifier vacuum tube 79. The amplifier 41 is shown associated with a filter comprising a series resistor 47 and a shunt capacitor 46. This filter may be connected, in any desired manner, to the input circuit of an amplifier vacuum tube 203.

According to the system of Fig. 10, both amplifiers 75 and 42 are variable The fixed amplifier 40 of Figs. 9 and 11 is replaced by the variable-gain amplifier 75, having a narrow range,, representing only the minimum range required for low-volume-level reproduction. It may provide for increase in amplification in a portion of this range, as by means of a resonant filter (not shown). This would improve balance. The variable-gain amplifier 41 is replaced by the variable-gain amplifier 42 having a wide range, operating at high-volume levels, for transmitting the entire range of frequencies that are desirable for high-level reproduction. The control circuit 6 is connected to the variable amplifier 42 in the same way as to the variable amplifier 41 of Fig. 9. The control circuit 6 is connected also, however, to the variable-gain amplifier 75 by corresponding separate control-output conductors 76 and 77.

The filter 7 (if employed) and the control circuit 6 turn on the wide-range amplifier 42 in the same manner that they turn on the amplifier 41 of Fig. 9. They turn off the narrow-range amplifier 75 through the control-output connecting conductors 76 and 77 when the signal contains strong frequency components within the range of the narrow-range amplifier 75. At low-volume or low-intensity levels, therefore, the restricted range of the amplifier 75 will reduce or attenuate the low-frequency components. At the high levels, the amplifier 75 will become substantially ineffective, and the wide-range amplifier 42 will then alone function. The combined frequency characteristics of the two amplifiers 75 and 42, under these conditions, should be such as to provide the desired overall response at any particular intermediate level. In the system of Fig. 10, therefore, the control circuit 6 renders one of the amplifiers 75 and 42 substantially ineffective when the other is effective, and vice versa.

The filter 7 insures that the control shall be in accordance with signals in the desired range. In the system of Fig. 10, too, under certain circumstances, the filter 7 may be eliminated, or the control circuit 6 may be actuated from the output of the narrow-range amplifier 75.

The main advantage of the system of Fig. 10 over that of Fig. 9 is that the narrow range may contain a certain amount of resonance, thus improving the reproduction in the neighborhood of the cut-off frequency at low levels. Such resonance, however, is undesirable at high levels, under which conditions the amplifier 75 is essentially turned off.

It is also possible to reduce the frequency range by phase reversal. The amplifier 40 of Fig. 9, for example, may have a wide range, and the output of the amplifier 41 may have a narrow range, reversed in phase, so as to reduce the overall range of the system. A variable-$\mu$ tube or other variable amplifier, moreover, may be used in the feed-back circuits of amplifiers (not shown) using feed-back, thus controlling the gain by controlling the feed-back.

In the case of amplifiers, as when variable filters are used, it is generally desirable to obtain the system shift from narrow-range to wide-range reproduction at a high rate of speed.

Essentially similar results, therefore, so far as steady-state conditions at low and high levels are concerned, may be obtained with either variable filters or variable amplifiers.

There is one important distinction between the operation of variable filters, as characterized by the system of Fig. 5, and the operation of variable amplifiers or variable filters in which variable resistive elements are varied. In a filter such as illustrated in Fig. 5, either with or without points of high attenuation, the variation takes the form of a variation of cut-off frequency, maintaining reasonably constant transmission down to that cut-off frequency, and rapidly increasing attenuation below that frequency. With variable amplifiers, or with filters employing variable resistance, the cut-off frequency remains substantially fixed, and the change in the all-over transmission characteristics is accomplished mainly by varying the attenuation below the cut-off frequency. While both systems will operate in substantially the same manner at the extremely low and high levels, it is obvious that, at intermediate levels, the characteristics will be somewhat different. Under these circumstances, the variable filter is generally more desirable since, under all conditions, it maintains substantially constant transmission up to the cut-off point, thus providing the best signal-to-noise ratio.

The advantages of the present invention may thus be realized in several different general forms, typical examples of which have been illustrated as utilizing either variable filters, or fixed filters with variable-gain amplifiers. Choice between one or another form depends upon the type of signal to be reproduced, as well as upon other considerations. In some cases, a combination of the two types may be justified. Various combinations of fixed and variable filters and amplifiers also may be utilized, unbalanced or push-pull. A variable filter may be employed to control one range of frequencies, for instance, and a variable amplifier to control another range of frequencies, or vice versa.

In accordance with usual conventions in the showing of vacuum tube circuits, the well-known operating-voltage sources, like batteries, power supplies, voltage dividers, bias resistors, transformers, and the like, are not illustrated. It will also be understood that, in any practical system, it may be desirable to add amplification or attenuation, so that the best operating conditions may be obtained.

Further modifications will also occur to persons skilled in the art, and all such are considered to fall within the spirit and scope of the present invention, as defined in the appended claims.

What is claimed is:

1. In the transmission of signals having substantially adjacent ranges of relatively-high-frequency components and relatively-low-frequency components, a method of the character described that comprises reducing the relatively-low-frequency components under control of the relatively-high-frequency components when the level of the relatively-high-frequency components falls below a predetermined value while maintaining substantially unchanged the transmission of the relatively-high-frequency components.

2. An electric system having, in combination, means for transmitting signals having relatively-high-frequency components and relatively-low-frequency components comprised in substantially adjacent frequency ranges, the transmitting means comprising control means to reduce the relatively-low-frequency components under control of the relatively-high-frequency components while maintaining substantially unchanged the transmission of the relatively-high-frequency components and means effective when the level of said relatively-high-frequency components falls below a predetermined value to control said control means to effect said reduction of the relatively-low-frequency components.

3. In an electric system for transmitting signals having relatively-high-frequency components and relatively-low-frequency components, a method of the character described that comprises reducing the relatively-low-frequency components under control of the high-frequency components when the level of the relatively-high-frequency components falls below a predetermined value, controlling the degree of reduction in accordance with the said level, the transmission of said relatively-high-frequency components remaining relatively unchanged.

4. An electric system having, in combination, means for transmitting signals having relatively-high-frequency components and relatively-low-frequency components, the transmitting means controlled by the relatively-high-frequency components comprising means effective when the level of the relatively-high-frequency components falls below a predetermined value to reduce the relatively-low-frequency components, means for controlling the degree of effectiveness of the reducing means, the transmission of said relatively-high-frequency components remaining relatively unchanged.

5. An electric system having, in combination, means for transmitting signals having relatively-high-frequency components and relatively-low-frequency components, the transmitting means comprising a filter for reducing the relatively-low-frequency components having a cut-off at a predetermined frequency below the relatively-high-frequency components, and means effective when the level of the signals falls below a predetermined value to vary the predetermined cut-off frequency to reduce the relatively-low-frequency components, the attenuation below cut-off being at a rate exceeding about six decibels per octave.

6. An electric system having, in combination, means for transmitting signals having relatively-high-frequency components and relatively-low-frequency components, the transmitting means comprising a filter for reducing the relatively-low-frequency components having two or more reactive arms providing a cut-off at a predetermined frequency below the relatively-high-frequency components, and means controlled in accordance with the signals for varying the predetermined cut-off frequency to reduce the relatively-low-frequency components at low levels of the signals.

7. An electric system having, in combination, means for transmitting signals having relatively-high-frequency components and relatively-low-frequency components, the transmitting means comprising a filter for reducing the relatively-low-frequency components having two or more reactive arms providing a cut-off at a predetermined frequency below the relatively-high-frequency components, and means effective when the level of the signals falls below a predetermined value to vary the predetermined cut-off frequency to reduce the relatively-low-frequency components.

8. An electric system having, in combination, means for transmitting signals having relatively-high-frequency components and relatively-low-frequency components, the transmitting means comprising a filter for reducing the relatively-low-frequency components having a cut-off at a predetermined frequency below the relatively-high-frequency components, and means having substantially maximum sensitivity to the relatively-high-frequency components and effective when the level of the signals falls below a predetermined value to vary the predetermined cut-off frequency to reduce the relatively-low-frequency components.

9. An electric system having, in combination, means for transmitting signals having relatively-high-frequency components and relatively-low-frequency components, the transmitting means comprising a filter for reducing the relatively-low-frequency components having a cut-off at a predetermined frequency below the relatively-high-frequency components, and means having substantially maximum sensitivity to the relatively-high-frequency components and controlled in accordance with the signals for varying the predetermined cut-off frequency to reduce the relatively-low-frequency components at low levels of the signals.

10. An electric system having, in combination, means for transmitting signals having relatively-high-frequency components above the maximum sensitivity of the ear and relatively-low-frequency components, the transmitting means comprising a filter for reducing the relatively-low-frequency components having a cut-off at a predetermined frequency below the relatively-high-frequency components, and means having a frequency characteristic corresponding approximately to the sensitivity characteristic of the ear controlled in accordance with the signals for varying the predetermined cut-off frequency to reduce the relatively-low-frequency components at low levels of the signals.

11. An electric system having, in combination, means for transmitting signals having relatively-low-frequency components below the range of maximum sensitivity of the ear and relatively-high-frequency components, the transmitting means comprising a filter for reducing the relatively-low-frequency components having a cut-off at a predetermined frequency below the relatively-high-frequency components, and means having a frequency characteristic corresponding approximately to the sensitivity characteristic of the ear effective when the level of the signals falls below a predetermined value to vary the predetermined cut-off frequency.

12. An electric system having, in combination, means for transmitting signals having relatively-low-frequency components and relatively-high-frequency components, the transmitting means comprising a filter for reducing the relatively-low-frequency components having a cut-off at a predetermined frequency below the relatively-high-frequency components, and means having substantially maximum sensitivity above the relatively-low-frequency components effective when the level of the signals falls below a predetermined value to vary the predetermined cut-off frequency.

13. An electric system having, in combination, means for transmitting signals having relatively-high-frequency components and relatively-low-frequency components, the transmitting means comprising a filter for attenuating the relatively-low-frequency components having a cut-off at a predetermined frequency below the relatively-high-frequency components and a point of substantially maximum attenuation, and means for varying the predetermined cut-off frequency in accordance with the signals to reduce the relatively-low-frequency components at low levels of the signals.

14. An electric system having, in combination, means for transmitting unmodulated signals having relatively-high-frequency components and relatively-low-frequency components, the transmitting means comprising a filter having a cut-off frequency for reducing the relatively-low-frequency components, and means effective when the level of the relatively-high-frequency components falls below a predetermined value to vary the cut-off frequency to reduce the relatively-low-frequency components.

15. A system for transmitting unmodulated signals having relatively-high-frequency components and relatively-low-frequency components and comprising low-frequency-reducing means comprising a series impedance and a shunt reactance tube with a control electrode, means for applying said signals to said reducing means, a rectifier, means for applying said high-frequency components to said rectifier and means for applying the resulting rectified voltage to said control electrode thereby controlling said reducing means in accordance with said relatively-high-frequency components so that the transmission of said relatively-low-frequency components is reduced at low levels of said relatively-high-frequency components.

16. A system for transmitting unmodulated signals having relatively-high-frequency components and relatively-low-frequency components and comprising low-frequency-reducing means comprising a series reactance and a shunt vacuum tube with a control electrode, means for applying said signals to said reducing means, a rectifier, means for applying said high-frequency components to said rectifier and means for applying the resulting rectified voltage to said control electrodes, thereby controlling said reducing means in accordance with said relatively-high-frequency components so that the transmission of said relatively-low-frequency components is reduced at low levels of said relatively-high-frequency components.

HERMON H. SCOTT.

REFERENCES CITED

The following references are of record in the file of this patent:

UNITED STATES PATENTS

| Number | Name | Date |
|---|---|---|
| 1,979,035 | Hammond | Oct. 30, 1934 |
| 1,993,859 | Roberts | Mar. 12, 1935 |
| 2,008,702 | Hammond | July 23, 1935 |
| 2,008,708 | Hammond | July 23, 1935 |
| 2,045,300 | Koch | June 23, 1936 |
| 2,096,760 | Purington | Oct. 26, 1937 |
| 2,112,595 | Farnham | Mar. 29, 1938 |
| 2,239,042 | Kleber et al. | Apr. 22, 1941 |
| 2,256,057 | Roberts | Sept. 16, 1941 |